(12) United States Patent
Herrada

(10) Patent No.: US 12,034,346 B2
(45) Date of Patent: Jul. 9, 2024

(54) BRUSHLESS DIRECT CURRENT ELECTRIC MOTOR AND ASSOCIATED CONTROL METHOD

(71) Applicant: Valeo Systemes d'Essuyage, La Verriere (FR)

(72) Inventor: Jose-Luis Herrada, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 524 days.

(21) Appl. No.: 17/251,283

(22) PCT Filed: Jun. 27, 2019

(86) PCT No.: PCT/EP2019/067247
§ 371 (c)(1),
(2) Date: Dec. 11, 2020

(87) PCT Pub. No.: WO2020/002553
PCT Pub. Date: Jan. 2, 2020

(65) Prior Publication Data
US 2021/0159767 A1    May 27, 2021

(30) Foreign Application Priority Data
Jun. 29, 2018   (FR) ...................................... 1856030

(51) Int. Cl.
*H02K 29/08*   (2006.01)
*G01D 5/14*   (2006.01)
(Continued)

(52) U.S. Cl.
CPC ............. *H02K 29/08* (2013.01); *G01D 5/145* (2013.01); *G01P 13/04* (2013.01); *H02P 6/16* (2013.01)

(58) Field of Classification Search
CPC ........ H02K 29/08; G01D 5/145; G01P 13/04; H02P 6/16
(Continued)

(56) References Cited

U.S. PATENT DOCUMENTS

| 11,063,538 B2 | 7/2021 | Herrada | |
| 11,228,263 B2* | 1/2022 | Ikeda | ......................... H02P 6/15 |
| 2009/0302793 A1* | 12/2009 | Kawamura | ............... H02P 6/16 |
| | | | 318/400.38 |

FOREIGN PATENT DOCUMENTS

| DE | 29901686 U1 | 4/1999 |
| EP | 2123522 A2 | 11/2009 |

(Continued)

OTHER PUBLICATIONS

Herrada (FR 3059174 A1) "Motor-Reducer, Wiping System and Control Method Thereof" Date Published: May 25, 2018 (Year: 2018).*

(Continued)

*Primary Examiner* — Jorge L Carrasquillo
(74) *Attorney, Agent, or Firm* — Valeo Systemes d'Essuyage

(57) ABSTRACT

A brushless DC motor (1) comprises a rotor comprising magnetic elements twining poles of the electric motor (1) and a control magnet comprising a number of pole pairs equal to three times that of the electric motor (1), a stator having electromagnetic excitation coils, at least one first and one second Hall-effect sensor (17, 17') configured to detect predetermined angular positions of the rotor, and a control unit configured to apply a predetermined sequence of excitation signals to the coils, wherein the Hall-effect sensors are spaced apart by an angle greater than or equal to 10°, the first Hall-effect sensor (17) is used to determine the switching times of the excitation signals and the second Hall-effect sensor (17') is used, in combination with the first Hall-effect sensor (17), to determine the direction of rotation of the rotor when the motor starts up, or vice versa.

7 Claims, 4 Drawing Sheets

Figure 1:
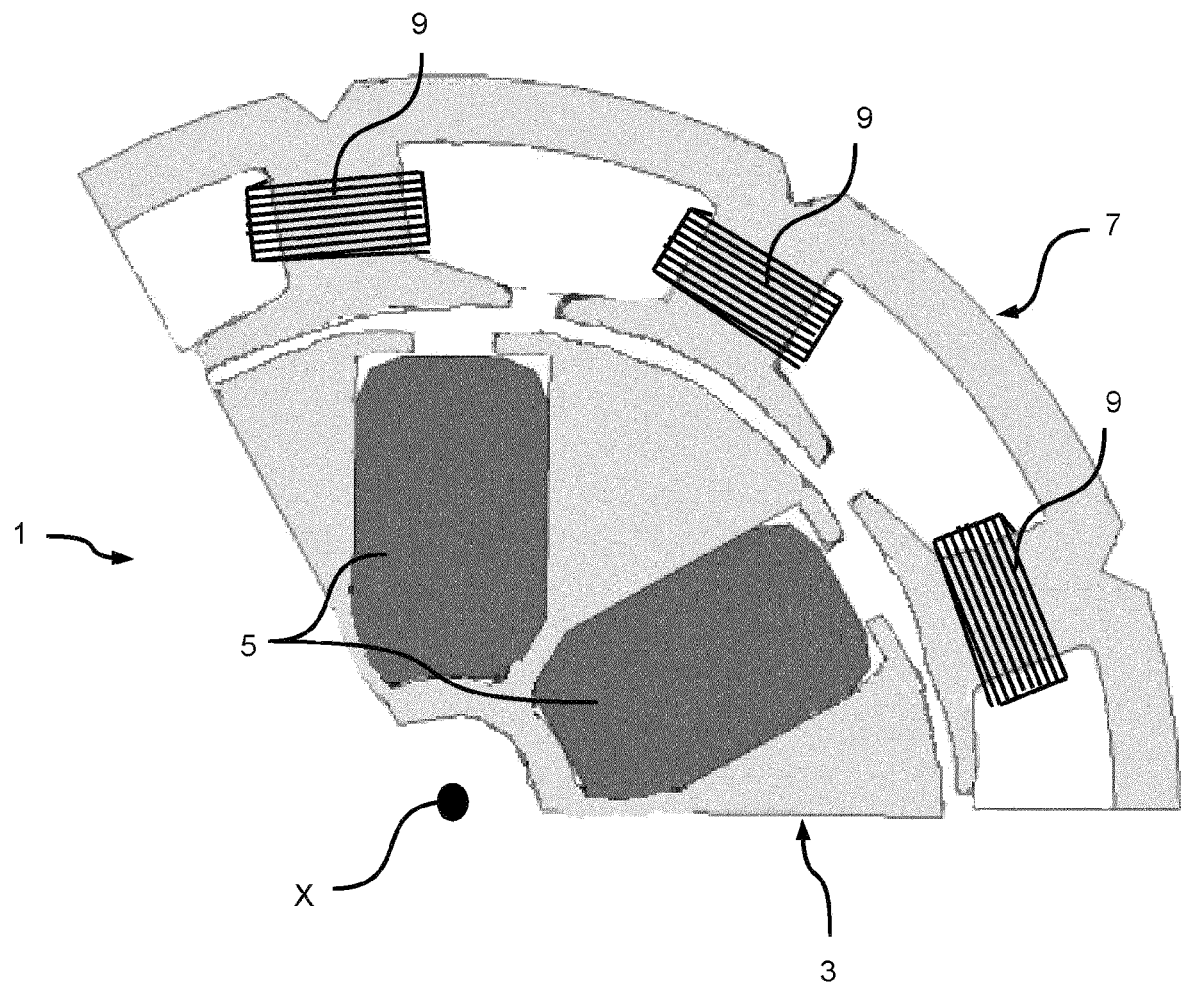

(51) Int. Cl.
*G01P 13/04* (2006.01)
*H02P 6/16* (2016.01)

(58) Field of Classification Search
USPC .................................................... 318/400.38
See application file for complete search history.

(56) References Cited

FOREIGN PATENT DOCUMENTS

| FR | 3059174 A1 | 11/2016 |
|----|------------|---------|
| JP | H1075594 A | 3/1998 |
| JP | 2005110363 A | 4/2005 |
| JP | 2014013809 A | 1/2014 |

OTHER PUBLICATIONS

Japan Patent Office, 1st Office Action (including English translation) of corresponding Japanese Patent Application No. 2020-573240, dated Feb. 22, 2022.
European Patent Office, International Search Report and Written Opinion for corresponding International Application No. PCT/EP2019/067247, dated Jul. 18, 2019 (including English translation of ISR).
A. Sikora, et al., "Impact of Hall sensors positioning on symmetry of BLDC control signals," International Symposium on Power Electronics Power Electronics, Electrical Drives, Automation and Motion, Sorrento, 2012, pp. 249-252, doi: 10.1109/SPEEDAM.2012.6264444.

* cited by examiner

BRUSHLESS DIRECT CURRENT ELECTRIC MOTOR AND ASSOCIATED CONTROL METHOD

CROSS-REFERENCE TO RELATED APPLICATIONS

This application is filed under 35 U.S.C. § 371 U.S. National Phase of International Application No. PCT/EP2019/067247 filed Jun. 27, 2019 (published as WO2020002553), which claims foreign priority benefit to French application No. 1856030 filed on Jun. 29, 2018, the disclosures of which are incorporated herein by reference in their entirety.

TECHNICAL FIELD

The present invention relates to a brushless direct-current electric motor intended, notably, for motor vehicle equipment.

BACKGROUND

Numerous brushless direct-current electric motors are used in motor vehicle equipment, notably in the geared motors of wiper devices.

Brushless direct-current electric motors may have many advantages, such as long service life, reduced overall dimensions and lower power consumption.

However, the control of the electric motors is more complicated, compared with electric motors with brushes, because in order to permit correct operation it is essential to have a precise knowledge of the angular position of the rotor of the brushless direct-current electric motor. This is because these electric motors comprise electromagnetic excitation coils positioned at the stator and supplied in an alternating manner via an inverter in order to drive permanent magnets positioned on the rotor.

In order to be able to switch the inverter switches, and therefore the supply to the electromagnetic coils, at the optimal instants to provide the desired drive to the rotor, the position of the rotor needs to be known, at least by sectors, with some precise points during the state switching (usually, six switches per revolution of the rotor for trapezoidal excitation).

SUMMARY

Liquid For this purpose, there is a known way of using Hall effect sensors, for example three sensors arranged at 120° for detecting the six precise points corresponding to the switching operations.

For a motor with six poles, there is also a form of assembly with two Hall effect sensors placed closely together, in which the two Hall effect sensors must be positioned at an angle of 10° with respect to the center of a control magnet for rapid detection of the direction of rotation. However, such an assembly is often impossible because of the size of commercially available sensors, the overall dimensions of which make it impossible to obtain the desired angle, notably when the control magnet is small in size.

Consequently there is a need to find a solution for providing a brushless direct-current electric motor with smaller overall dimensions at a limited cost.

For this purpose, the present invention relates to a brushless direct-current electric motor comprising:

a rotor comprising magnetic elements distributed around the rotor to form poles of the electric motor, and a control magnet having a pole pair number equal to three times the pole pair number of the electric motor, a stator having electromagnetic excitation coils, at least a first and a second Hall effect sensor, preferably only a first and a second Hall effect sensor, said Hall effect sensors being configured for detecting predetermined angular positions of the rotor, a control unit configured for applying a predetermined sequence of excitation signals to the coils according to the position of the rotor for driving the rotor in rotation, wherein the first Hall effect sensor and the second Hall effect sensor are positioned on a printed circuit and are spaced so that the angle between the straight lines passing through the center of the control magnet and the first Hall effect sensor and the second Hall effect sensor respectively is greater than or equal to 10°, and wherein the first Hall effect sensor is used for determining the switching instants of the excitation signals, and the second Hall effect sensor is used, in combination with the first Hall effect sensor, for determining the direction of rotation of the rotor at the moment of starting, or inversely as regards the first Hall effect sensor and the second Hall effect sensor.

The electric motor according to the present invention may also comprise the following aspects:

the control magnet and the first and second Hall effect sensors are configured so that the changes of state of one and the other of said first and second Hall effect sensors take place, respectively, before and after the instant of switching of the excitation signals, and so that the period between the change of state of one of the Hall effect sensors and the instant of switching of the excitation signals is equal to the period between the instant of switching of the excitation signals and the change of state of the other Hall effect sensor when the rotor rotates at a constant speed, the Hall effect sensor that leads the instant of switching is used by the control unit for determining the instants of switching, the Hall effect sensor that lags the instant of switching being used, in combination with the Hall effect sensor that leads the instant of switching, for determining the direction of rotation of the rotor at the moment of starting.

the angle between the straight lines passing through the center of the control magnet and the first Hall effect sensor and the second Hall effect sensor respectively is less than 19°.

the angle between the straight lines passing through the center of the control magnet and the first Hall effect sensor and the second Hall effect sensor respectively is substantially equal to 16°.

The present invention also relates to a geared motor, notably for a wiper device, comprising:

an electric motor as described above.

The present invention also relates to a method for controlling a brushless direct-current electric motor, said electric motor comprising:

a rotor comprising magnetic elements distributed around the rotor to form poles of the electric motor, and a control magnet having a pole pair number equal to three times the pole pair number of the electric motor, a stator having electromagnetic excitation coils, at least a first and a second Hall effect sensor, preferably only a first and a second Hall effect sensor, said Hall effect sensors being configured for detecting predetermined angular positions of the rotor, a printed circuit on which are positioned the first and second Hall effect sensors, the two Hall effect sensors being spaced so that the angle between the straight lines passing through the center of the control magnet and the first Hall effect sensor and the second Hall effect sensor respectively is greater than or equal to 10°, the method comprising:

a preliminary step of determining a predetermined sequence of excitation signals to be applied to the coils according to the position of the rotor for driving the rotor in rotation, a step of determining the instants of switching of the excitation signals on the basis of the signal supplied by one of the Hall effect sensors, a step of determining the direction of rotation of the rotor on the basis of the signals supplied by the Hall effect sensors, a step of applying a predetermined sequence of excitation signals on the basis of the determined instants of switching.

According to another aspect of the present invention, the control magnet and the first and second Hall effect sensors are configured so that the changes of state of said first and second Hall effect sensors take place, respectively, before and after the instant of switching of the excitation signals, and so that the period between the change of state of one of the Hall effect sensors and the instant of switching of the excitation signals is equal to the period between the instant of switching of the excitation signals and the change of state of the other Hall effect sensor when the rotor rotates at a constant speed, the instants of switching being determined on the basis of the signal supplied by the Hall effect sensor that leads the instant of switching, the Hall effect sensor that lags the instant of switching being used, in combination with the Hall effect sensor that leads the instant of switching, for determining the direction of rotation of the rotor at the moment of starting.

DETAILED DESCRIPTION OF THE DRAWINGS

Figure 2:
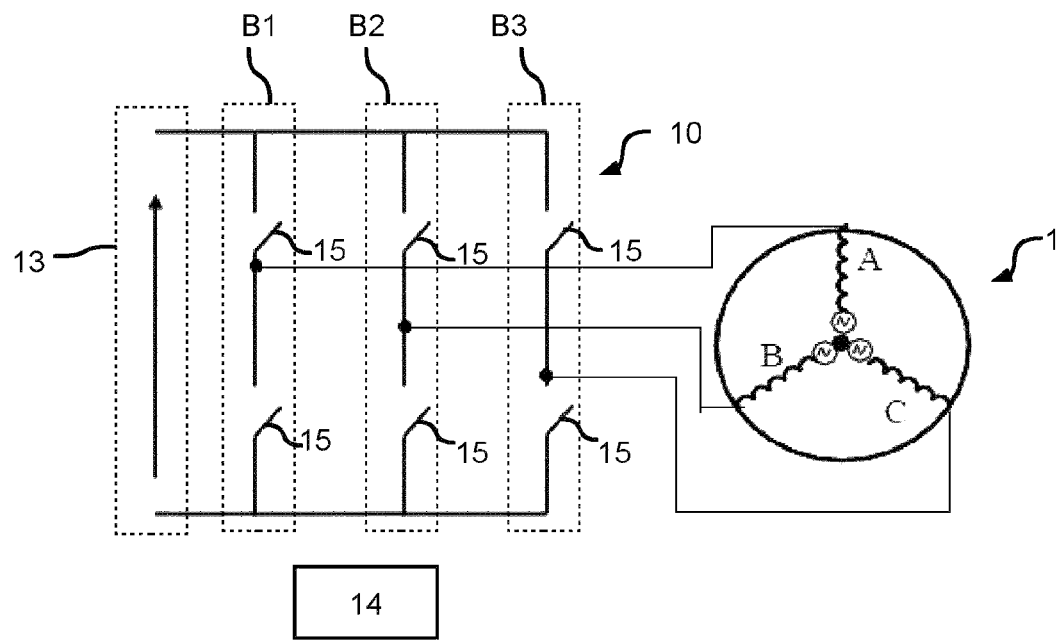
Figure 3:
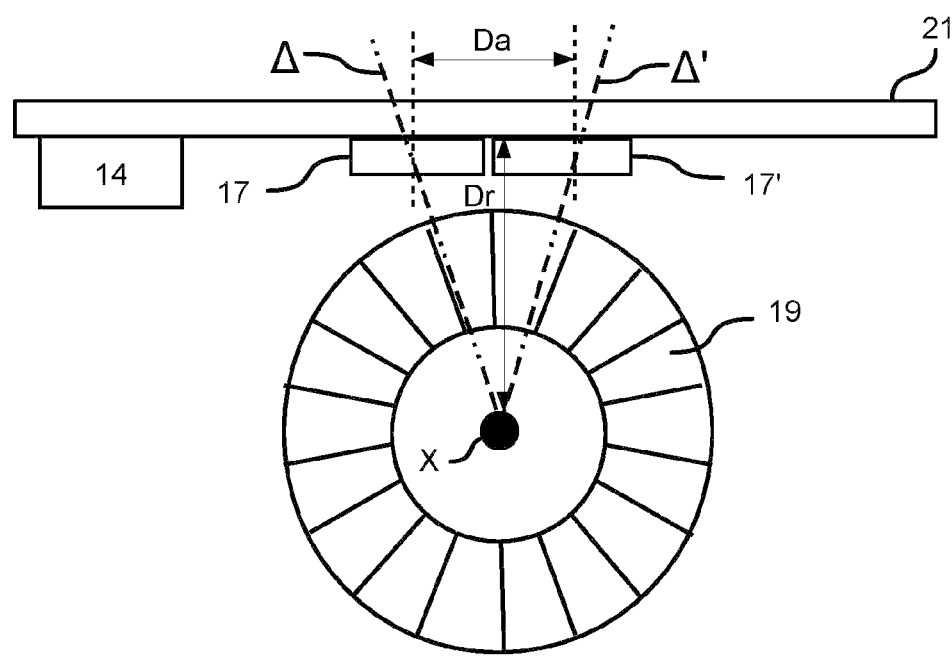
Figure 4:
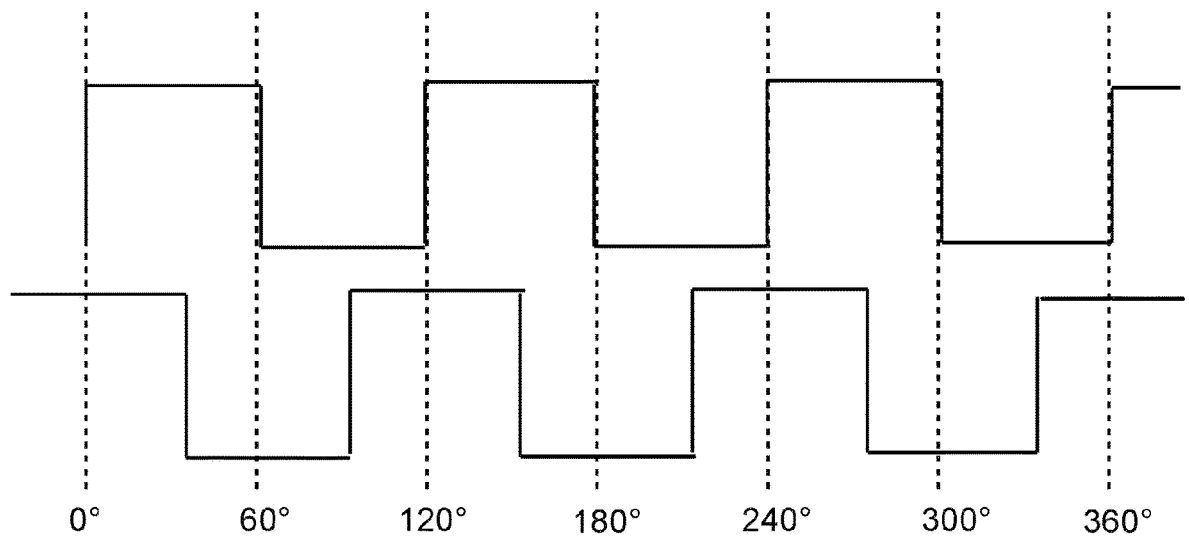
Figure 5:
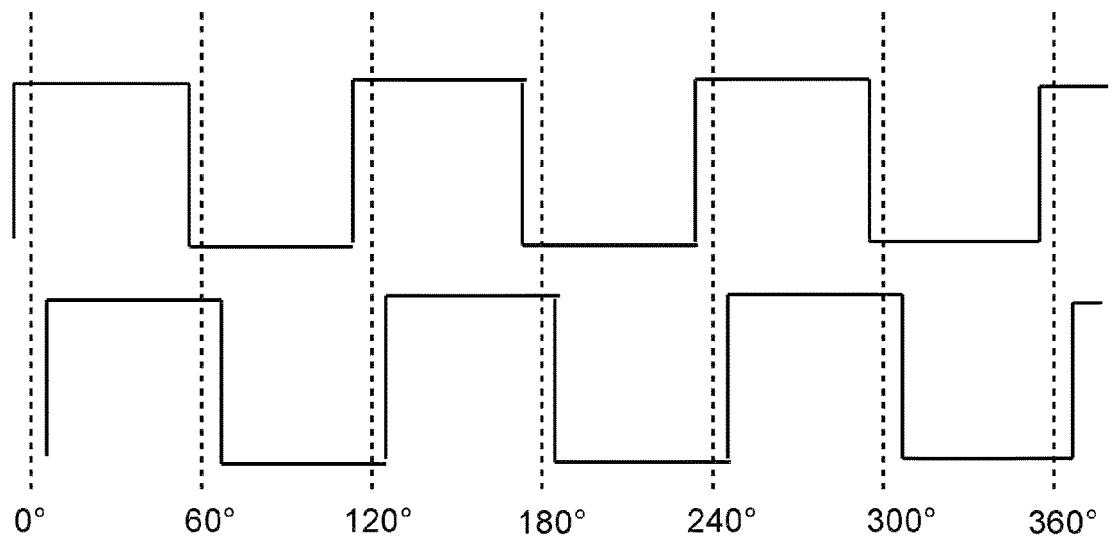
Figure 6:
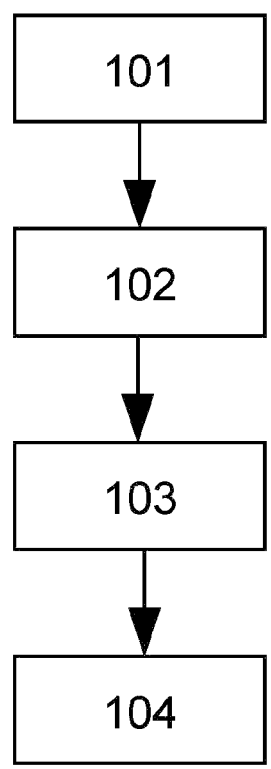

Further features and advantages of the invention will become apparent from reading the following detailed description, which is understood with reference to the accompanying drawings, in which:

FIG. 1 shows a diagram of an electric motor with integrated (or embedded or buried) magnets according to the present invention, FIG. 2 shows a diagram of a power supply circuit of an electric motor, FIG. 3 shows a diagram of the Hall effect sensors and of the associated control magnet, FIG. 4 shows a diagram of the signals sent from the Hall effect sensors according to a first configuration, FIG. 5 shows a diagram of the signals sent from the Hall effect sensors according to a second configuration, FIG. 6 shows a flow chart of the steps of a method for controlling an electric motor according to the present invention.

In all the figures, identical elements are given the same reference numerals.

The following embodiments are examples. Although the description refers to one or more embodiments, this does not necessarily signify that each reference relates to the same embodiment, or that the characteristics are solely applicable to a single embodiment. Simple characteristics of different embodiments may also be combined or interchanged to provide other embodiments.

DETAILED DESCRIPTION

The following embodiments are examples. Although the description refers to one or more embodiments, this does not necessarily signify that each reference relates to the same embodiment, or that the characteristics are solely applicable to a single embodiment. Simple characteristics of different embodiments may also be combined or interchanged to provide other embodiments.

The present invention relates to a brushless direct-current electric motor, for example an electric motor used in motor vehicle equipment such as the geared motors of wiper devices. The present invention also relates to such a geared motor.

FIG. 1 shows a partial schematic view of an electric motor comprising a rotor 3 mounted rotatably about an axis of rotation X and comprising a plurality of poles. These poles are, for example, formed by permanent magnets 5 distributed around the axis of rotation X of the rotor 3 and configured for forming an alternation of north and south poles.

The electric motor also comprises a stator 7 comprising a plurality of electromagnetic excitation coils 9 forming the phases of the electric motor, which, when supplied with power, enable the rotor 3 to be driven in rotation as a result of the interaction between the electromagnetic excitation coils 9 and the poles of the rotor 3.

FIG. 2 shows a diagram of an example of a power supply circuit of the phases of an electric motor 1. In the present case, the electric motor 1 comprises three phases, denoted A, B and C, in a triangular arrangement, connected to a midpoint. The power supply circuit comprises an inverter 10. The inverter 10 comprises three branches B1, B2 and B3, arranged in parallel and connected to the terminals of a voltage source 13. Each branch B1, B2, B3 comprises two switches 15 arranged in series. The opening and closing of the switches 15 are controlled by a control unit 14, taking the form of a microcontroller or a microprocessor, for example. The midpoints of the branches B1, B2 and B3 are connected, respectively, to phases A, B and C of the electric motor 1.

However, to enable the control unit 14 to carry out the opening and closing of the switches 15 in the optimal way to put the rotor 3 into rotation in the desired direction of rotation at the desired speed, it is essential to know precisely the position of the rotor 3 once every 60 electrical degrees.

For this purpose, as shown in FIG. 3, a first Hall effect sensor 17 is coupled to a control magnet 19 comprising a number of poles equal to three times the number of poles of the electric motor 1, for example eighteen poles for an electric motor 1 comprising six poles, so that the changes of state of the Hall effect sensor 17 (the passage from a high to a low level, or vice versa) take place every 60 electrical degrees (i.e. 20° for an electric motor with six poles).

To determine the direction of rotation of the rotor 3 at the moment of starting, a second Hall effect sensor 17' is also used. This second Hall effect sensor 17' is, for example, coupled to the same control magnet 19 as the first Hall effect sensor 17.

Additionally, in order to reduce the cost and overall dimensions of the electric motor 1, the first Hall effect sensor 17 and the second Hall effect sensor 17' must be integrated into a printed circuit 21, which limits the possibilities for positioning the Hall effect sensors 17, 17' in relation to the control magnet 19.

In the case of an electric motor 1 comprising six poles, that is to say three pairs of poles, the switching of the inverter 10 must take place every 20°. Thus, in order to detect the direction of rotation of the rotor 3 on starting, the second Hall effect sensor 17' must be positioned so that the straight lines Δ and Δ' perpendicular to the axis of rotation X and passing, respectively, through the center of the first Hall effect sensor 17 and the center of the second Hall effect sensor 17' form an angle of 10°. This means that the distance Da between the centers of the two Hall effect sensors 17 and 17' is given by the following equation:

$$Da=2*Dr*\tan(10/2)$$

where Dr is the distance between the axis of rotation X of the control magnet 19 and the printed circuit 21. The size of the protective housing of the sensors 17 and 17' must also be allowed for. The housings are, for example, parallelepipedal in shape, and the Hall effect sensor is located in the center of the parallelepiped. The width of the housing is, for example, between 2 and 3 mm, and the height of the housing is, for example, between 1.5 and 2.5 mm. Thus it is possible to determine the distance by which the two Hall effect sensors 17 and 17' must be separated to conform to an angle of 10°. If this distance is less than the width of the housing, which is the case when a small-diameter control magnet 19 is used, it is impossible to conform to the angle of 10°. To avoid having to increase the diameter of the control magnet 19, thus increasing the overall dimensions of the electric motor 1, the two sensors 17 and 17' are arranged on the printed circuit 21 as closely as possible to one another, and the signal processing is adapted according to the resulting angle between the two straight lines Δ and Δ' passing through the center of the control magnet 19 and the centers of the first Hall effect sensor 17 and the second Hall effect sensor 17' respectively. In this example, therefore, this angle is greater than 10°, for example 14°. In this case, the Hall effect sensors 17, 17' and the control magnet 19 are configured for obtaining a phase leading signal, as described below with reference to FIG. 5.

FIG. 4 shows the signals obtained by the first Hall effect sensor 17 and the second Hall effect sensor 17' in the case where the sensors 17 and 17' are positioned so that the angle between the two straight lines Δ and Δ' passing through the center of the control magnet 19 and the first Hall effect sensor 17 and the second Hall effect sensor 17' respectively is equal to 10°. The changes of state of the first Hall effect sensor 17 correspond to the instants of switching, and the changes of state of the second Hall effect sensor 17' take place at time intervals whose durations are equal to the durations of the changes of state of the first Hall effect sensor 17 when the rotor 3 rotates at a constant speed. The second Hall effect sensor 17' is used in combination with the first Hall effect sensor 17 to determine the direction of rotation of the rotor 3. Advantageously, intermediate switching operations may also be carried out to generate smaller intervals and reduce further the noise generated by the motor.

If the angle between the two straight lines Δ and Δ' passing through the center of the control magnet 19 and the first Hall effect sensor 17 and the second Hall effect sensor 17' respectively is greater than or equal to 10°, for example 14°, the Hall effect sensors 17 and 17' and the control magnet 19 are configured so that the changes of state of the Hall effect sensors 17 and 17' take place with a lead over the instant of switching which is equal for both Hall effect sensors 17 and 17', one of which leads in a first direction of rotation while the other leads in the second direction of rotation of the rotor 3, as shown schematically in FIG. 5. Thus, in this configuration, the signal used to determine the instants of switching is either the signal sent from the first Hall effect sensor 17 or the signal sent from the second Hall effect sensor 17', depending on the direction of rotation of the rotor 3. The other Hall effect sensor 17, 17', which lags behind the instant of switching, is used in combination with the Hall effect sensor 17, 17' used to determine the instants of switching, in order to determine the direction of rotation of the rotor 3.

Thus, this configuration makes it possible to use a small-diameter control magnet 19 while positioning the two Hall effect sensors 17, 17' on a printed circuit, so as to provide an electric motor 1 with small overall dimensions. Furthermore, by using a Hall effect sensor 17, 17' supplying a phase leading signal, a higher running torque can be obtained without the need for electronic processing of the signals transmitted by the Hall effect sensors 17, 17'.

It should be noted that the two sensors may have the same state or different states. Different states indicate that switching is not near, and the same states indicate that the switching area is near. If the two sensors have been offset in order to offset the two switching operations, one switching operation may be given priority over the other to determine the direction of rotation of the motor.

The present invention also relates to a method for controlling an electric motor as described above. The different steps of the method will now be described with reference to the flow chart in FIG. 6.

The first step 101 is concerned with a preliminary step of determining a predetermined sequence of excitation signals to be applied to the coils 9 according to the position of the rotor 3 for driving the rotor 3 in rotation. This determination corresponds to the determination of the position (open or closed) of the switches 15 of the inverter 10 allowing the coils 9 to be supplied with power according to the angular position of the rotor 3.

The second step 102 corresponds to the determination of the instants of switching of the excitation signals on the basis of the signal supplied by one of the Hall effect sensors 17 or 17'. The choice of the Hall effect sensor 17, 17' for determining the instants of switching of the excitation signals depends, for example, on the direction of rotation of the rotor 3. In such a case, one Hall effect sensor may be used to determine the position of the motor and the other Hall effect sensor may be used to determine the direction of rotation of the rotor.

Step 103 corresponds to the determination of the direction of rotation of the rotor 3 on the basis of the signals supplied by the two Hall effect sensors 17 and 17'.

Step 104 concerns the application of the sequence of excitation signals determined in step 101 in accordance with the instants of switching determined in step 102.

By using a position of the Hall effect sensors in which the angle between the two straight lines Δ and Δ' passing through the center of the control magnet 19 and the first Hall effect sensor 17 and the second Hall effect sensor 17' respectively is greater than or equal to 10° as described above, a phase leading signal is obtained, resulting in a higher running torque. This phase lead is obtained without the need for electronic processing of the signals transmitted by the Hall effect sensors 17, 17'.

What is claimed is:

1. A brushless direct-current electric motor comprising:
a rotor comprising magnetic elements distributed around the rotor to form poles of the electric motor, and a control magnet having a pole pair number equal to three times the pole pair number of the electric motor,
a stator having electromagnetic excitation coils,
at least a first and a second Hall effect sensor, said Hall effect sensors being configured for detecting predetermined angular positions of the rotor,
a control unit configured for applying a predetermined sequence of excitation signals to the coils according to the position of the rotor for driving the rotor in rotation,
wherein the first Hall effect sensor and the second Hall effect sensor are positioned on a printed circuit and are spaced so that the angle between the straight lines passing through the center of the control magnet and the first Hall effect sensor and the second Hall effect sensor respectively is greater than or equal to 10°, and wherein the first Hall effect sensor is used for determining the switching instants of the excitation signals, and the second Hall effect sensor is used, in combination with the first Hall effect sensor, for determining the direction of rotation of the rotor at the moment of starting, or inversely as regards the first Hall effect sensor and the second Hall effect sensor.

2. The electric motor as claimed in claim 1, wherein the control magnet and the first and second Hall effect sensors are configured so that the changes of state of one and the other of said first and second Hall effect sensors take place, respectively, before and after the instant of switching of the excitation signals, and so that the period between the change of state of one of the Hall effect sensors and the instant of switching of the excitation signals is equal to the period between the instant of switching of the excitation signals and the change of state of the other of the Hall effect sensors when the rotor rotates at a constant speed, and wherein the Hall effect sensor that leads the instant of switching is used by the control unit for determining the instants of switching, the Hall effect sensor that lags the instant of switching being used, in combination with the Hall effect sensor that leads the instant of switching, for determining the direction of rotation of the rotor at the moment of starting.

3. The electric motor as claimed in the claim 1, wherein the angle between the straight lines passing through the center of the control magnet and the first Hall effect sensor and the second Hall effect sensor respectively is less than 19°.

4. The electric motor as claimed in claim 1, wherein the angle between the straight lines passing through the center of the control magnet and the first Hall effect sensor and the second Hall effect sensor respectively is substantially equal to 16°.

5. A geared motor, for a wiper device, comprising an electric motor as claimed in claim 1.

6. A method for controlling a brushless direct-current electric motor, said electric motor comprising:
a rotor comprising magnetic elements distributed around the rotor to form poles of the electric motor, and a control magnet having a pole pair number equal to three times the pole pair number of the electric motor,
a stator having electromagnetic excitation coils,
at least a first and a second Hall effect sensor, said Hall effect sensors being configured for detecting predetermined angular positions of the rotor,
a printed circuit on which are positioned the first and second Hall effect sensors, the two Hall effect sensors being spaced so that the angle between the straight lines passing through the center of the control magnet and the first Hall effect sensor and the second Hall effect sensor respectively is greater than or equal to 10°,
the method comprising:
a preliminary step of determining a predetermined sequence of excitation signals to be applied to the coils according to the position of the rotor for driving the rotor in rotation,
a step of determining the instants of switching of the excitation signals on the basis of the signal supplied by one of the Hall effect sensors,
a step of determining the direction of rotation of the rotor on the basis of the signals supplied by the Hall effect sensors,
a step of applying a predetermined sequence of excitation signals on the basis of the determined instants of switching.

7. The method as claimed in claim 6, wherein the control magnet and the first and second Hall effect sensors are configured so that the changes of state of one and the other of said first and second Hall effect sensors take place, respectively, before and after the instant of switching of the excitation signals, and so that the period between the change of state of one of the Hall effect sensors and the instant of switching of the excitation signals is equal to the period between the instant of switching of the excitation signals and the change of state of the other of the Hall effect sensors when the rotor rotates at a constant speed, and wherein the instants of switching are determined on the basis of the signal supplied by the Hall effect sensor that leads the instant of switching, the Hall effect sensor that lags the instant of switching being used, in combination with the Hall effect sensor that leads the instant of switching, for determining the direction of rotation of the rotor at the moment of starting.

* * * * *